(12) United States Patent
Murray

(10) Patent No.: US 8,634,113 B2
(45) Date of Patent: Jan. 21, 2014

(54) RECORDING MEDIA PATH IN A MULTIFUNCTION PRINTER

(75) Inventor: Richard A. Murray, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 627 days.

(21) Appl. No.: 12/913,081

(22) Filed: Oct. 27, 2010

(65) Prior Publication Data

US 2012/0105920 A1    May 3, 2012

(51) Int. Cl.
*H04N 1/04*    (2006.01)

(52) U.S. Cl.
USPC ........... 358/474; 358/400; 358/473; 358/498; 347/105; 347/222

(58) Field of Classification Search
USPC .................. 358/474, 400, 1.9, 473, 472, 494; 347/222, 105
See application file for complete search history.

(56) References Cited

U.S. PATENT DOCUMENTS

| | | | |
|---|---|---|---|
| 4,344,098 A * | 8/1982 | Kamimura et al. | 360/96.61 |
| 4,936,698 A * | 6/1990 | Clyburn | 400/613.2 |
| 5,473,507 A * | 12/1995 | Schwegler et al. | 361/690 |
| 5,608,430 A | 3/1997 | Jones et al. | |
| 5,896,206 A * | 4/1999 | Kellogg | 358/498 |
| 6,771,399 B1 * | 8/2004 | Batten | 358/497 |
| 7,417,658 B2 * | 8/2008 | Montagutelli | 347/222 |
| 2002/0067513 A1 * | 6/2002 | Sasai et al. | 358/400 |
| 2003/0001939 A1 * | 1/2003 | Scofield et al. | 347/105 |
| 2004/0202500 A1 * | 10/2004 | Schalk et al. | 400/283 |
| 2006/0000056 A1 * | 1/2006 | Connors et al. | 16/65 |
| 2006/0083542 A1 | 4/2006 | Ito | |
| 2006/0268027 A1 * | 11/2006 | Lim | 347/9 |
| 2008/0266588 A1 * | 10/2008 | Inaba | 358/1.13 |
| 2009/0324263 A1 | 12/2009 | Shimizu et al. | |
| 2011/0096342 A1 * | 4/2011 | Burke et al. | 358/1.9 |

FOREIGN PATENT DOCUMENTS

JP    2005-053648    3/2005

* cited by examiner

*Primary Examiner* — Allen H Nguyen
(74) *Attorney, Agent, or Firm* — Peyton C. Watkins (57) ABSTRACT

A multifunction printer includes a) a printing apparatus having: i) a printer chassis having a media input region, a printing region, and a media support element; ii) a carriage configured to move a printhead in a carriage scan direction along the printing region; and iii) a plurality of rollers configured to transport a recording medium from the media input region, across the media support element and to the printing region; and b) a scanning apparatus to convert an image into digitized data, the scanning apparatus including a base that is affixed to the printer chassis, wherein the base of the scanning apparatus comprises a guide for the recording medium.

15 Claims, 9 Drawing Sheets

RECORDING MEDIA PATH IN A MULTIFUNCTION PRINTER

CROSS-REFERENCE TO RELATED APPLICATIONS

Reference is made to commonly assigned, co-pending U.S. patent application Ser. No. 12/913,100 filed Oct. 27, 2010, entitled: "Inclined Motor in an Inkjet Printer", co-pending U.S. patent application Ser. No. 12/913,115, filed Oct. 27, 2010, entitled: "Method of Assembling a Multifunction Printer", and co-pending U.S. patent application Ser. No. 12/913,139, filed Oct. 27, 2010, entitled: "Paper Feeding Assembly for Printers" the disclosures of which are incorporated herein.

FIELD OF THE INVENTION

This invention pertains generally to carriage printer apparatus and more particularly to apparatus and methods for providing a path for recording media in a multifunction printer device.

BACKGROUND OF THE INVENTION

The all-in-one (AIO) printer is a multi-function device that typically includes at least a printer and a document scanner in a single, compact package. Its reduced footprint, lower cost, and versatility make the AIO printer a desirable architecture for desktop print and document handling applications.

Many multi-function printers use a carriage-based printer, such as an inkjet carriage printer, which has advantages in size, performance, and cost. In the inkjet carriage printer, a printhead is mounted in a carriage that is moved back and forth across the region of printing. To print an image on a sheet of paper or other recording medium (sometimes generically referred to as paper herein), the recording medium is advanced a given distance along a recording medium advance direction and then momentarily stopped. While the recording medium is stopped and supported on a platen, the printhead carriage is moved along a carriage scan direction. The carriage scan direction extends substantially perpendicular to the recording medium advance direction. In the course of printhead travel along the carriage scan direction, controllable marking elements in the printhead record marks on the recording medium—for example by ejecting drops from an inkjet printhead. After the carriage has printed a swath of the image while traversing the recording medium, the recording medium is advanced incrementally, the carriage direction of motion is reversed, and marking is repeated with printhead movement in the reverse direction. By repeating this process a number of times, the printer forms the image onto the recording medium, swath by swath.

Internal printer components provide controlled movement of the recording medium in one direction, coordinated and synchronized with controlled movement of the printhead along the carriage scan direction. Providing this type of controlled movement requires a stable support structure for the various moving components and media.

Figure 1:
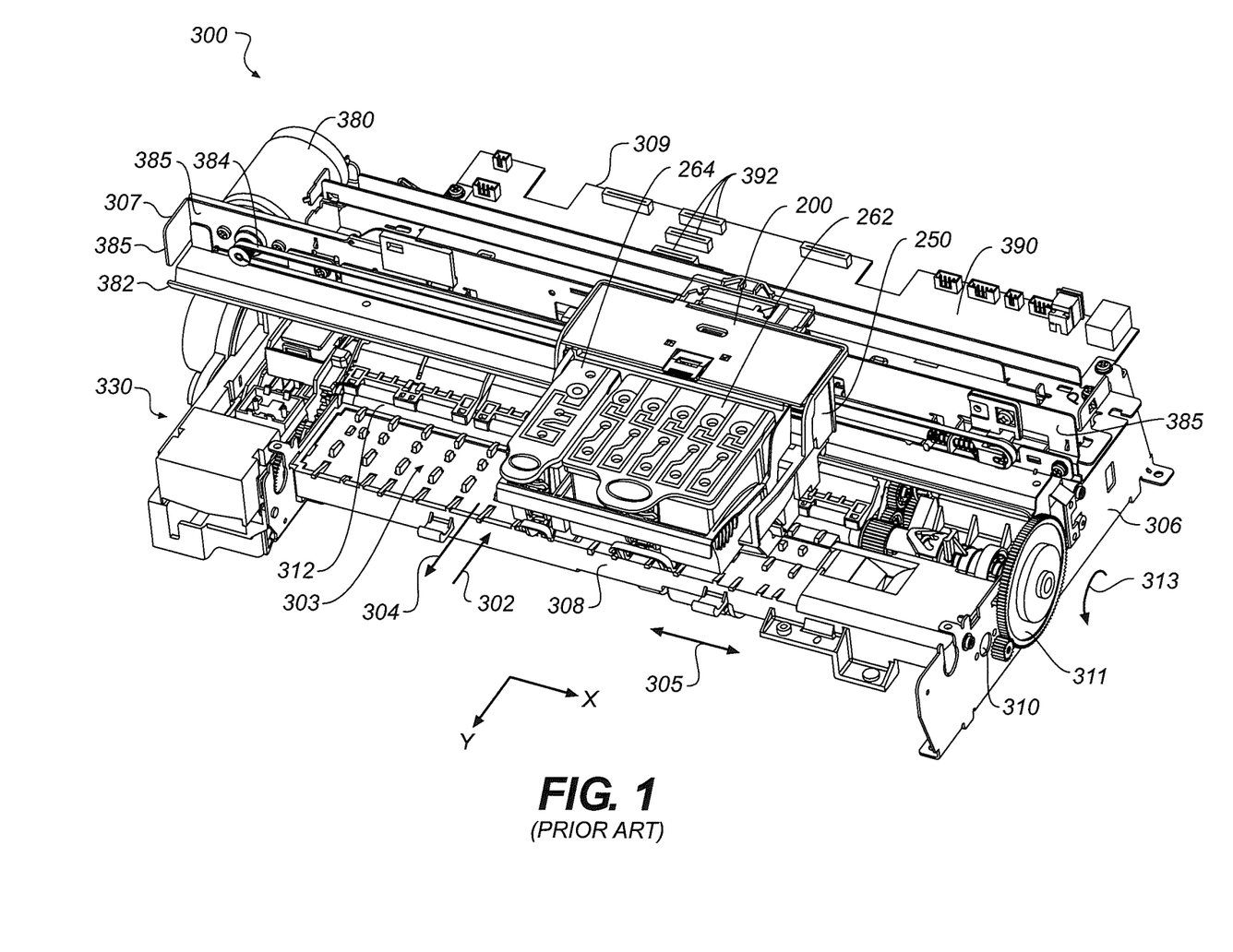
FIG. 1 is a perspective view showing components of a prior art carriage printer.

By way of example, FIG. 1 shows a portion of a prior art carriage printer. 300, with some parts hidden so that other parts can be more clearly seen. Printer 300 has a printing region 303 across which a carriage 200 is moved back and forth along a carriage scan direction 305 that extends along the X axis between the right side 306 and the left side 307 of printer 300 while printing on recording medium that is supported by the platen that provides printing region 303. Carriage motor 380 moves a belt 384 to move carriage 200 back and forth along carriage guide rail 382. In this way, carriage 200 is actuable to move along a carriage scan direction 305. Printhead 250 is mounted in carriage 200, and ink supplies 262 and 264 are mounted in the printhead 250. In this orientation of printhead 250, the droplets of ink are ejected downward onto the recording media in printing region 303 in the view of FIG. 1. Ink supply 262, in this example, contains five ink sources cyan, magenta, yellow, photo black, and colorless protective fluid, while ink supply 264 contains the ink source for text black.

Paper, or other recording medium is loaded along paper load entry direction 302 toward the front 308 of printer 300. Printed paper traveling from the rear 309 exits along direction 304. A feed roller 312 includes a feed roller shaft along its axis, and a feed roller gear 311 is mounted on the freed roller shaft. The motor that powers the paper advance rollers is not shown in FIG. 1, but a hole 310 at the right side 306 of the printer 300 is where the motor gear (not shown) protrudes through in order to engage feed roller gear 311, as well as the gear for the discharge roller (not shown). For normal paper pick-up and feeding, all rollers rotate in forward direction 313. Toward the left side 307 in the example of FIG. 1 is a maintenance station 330. Toward the rear 309 of the printer in this example is located an electronics hoard 390, which contains cable connectors 392 for communicating via cables (not shown) to the printhead carriage 200 and from there to the printhead. Also on the electronics board are typically mounted motor controllers for the carriage motor 380 and for the paper advance motor, a processor and/or other control electronics for controlling the printing process, and an optional connector for a cable to a host computer.

In the prior art printer of FIG. 1, carriage guide rail 382 is part of a metal supporting structure that acts as a type of "backbone" 385 that extends from left side 307 to right side 306 of the printer for support and for attaching printer components. In conventional practice, components of carriage printer 300 are assembled onto this backbone and fastened securely using screws, bolts, clips, and other suitable types of fasteners. A component that is not shown in FIG. 1 (in order to show feed roller 312 more clearly) is a pinch roller assembly that is suspended from backbone 385 and that includes rollers that are pressed against feed roller 312 in order to provide a nip for advancing paper. The backbone itself is fastened in place to the printer base (not shown), again using screws or other suitable fasteners. This conventional assembly method works acceptably, but has a number of drawbacks, including the following:
 (i) Fabrication complexity of the conventional backbone. The conventional backbone is typically formed by a series of bends in sheet metal. Sheet metal bending tolerances make fabrication of the backbone to the required tolerances difficult.
 (ii) Assembly complexity. Assembly of carriage printer 300 using the conventional backbone arrangement requires a number of fasteners, complicating the assembly sequence. The backbone itself also needs to be attached to the printer base.

Competitive pressures drive the need to provide high quality printing at lower cost. There is a recognized need to reduce the parts count and complexity of these systems and to simplify printer assembly without compromising image quality and performance.

SUMMARY OF THE INVENTION

The present invention is directed to overcoming one or more of the problems set forth above. Briefly summarized, according to one aspect of the invention, the invention resides in a multifunction printer comprising: a) a printing apparatus including: i) a printer chassis having a media input region, a printing region, and a media support element; ii) a carriage configured to move a printhead in a carriage scan direction along the printing region; and iii) a plurality of rollers configured to transport a recording medium from the media input region, across the media support element and to the printing region; and b) a scanning apparatus to convert an image into digitized data, the scanning apparatus including a base that is affixed to the printer chassis, wherein the base of the scanning apparatus comprises a guide for the recording medium.

DETAILED DESCRIPTION OF THE INVENTION

Figure 2:
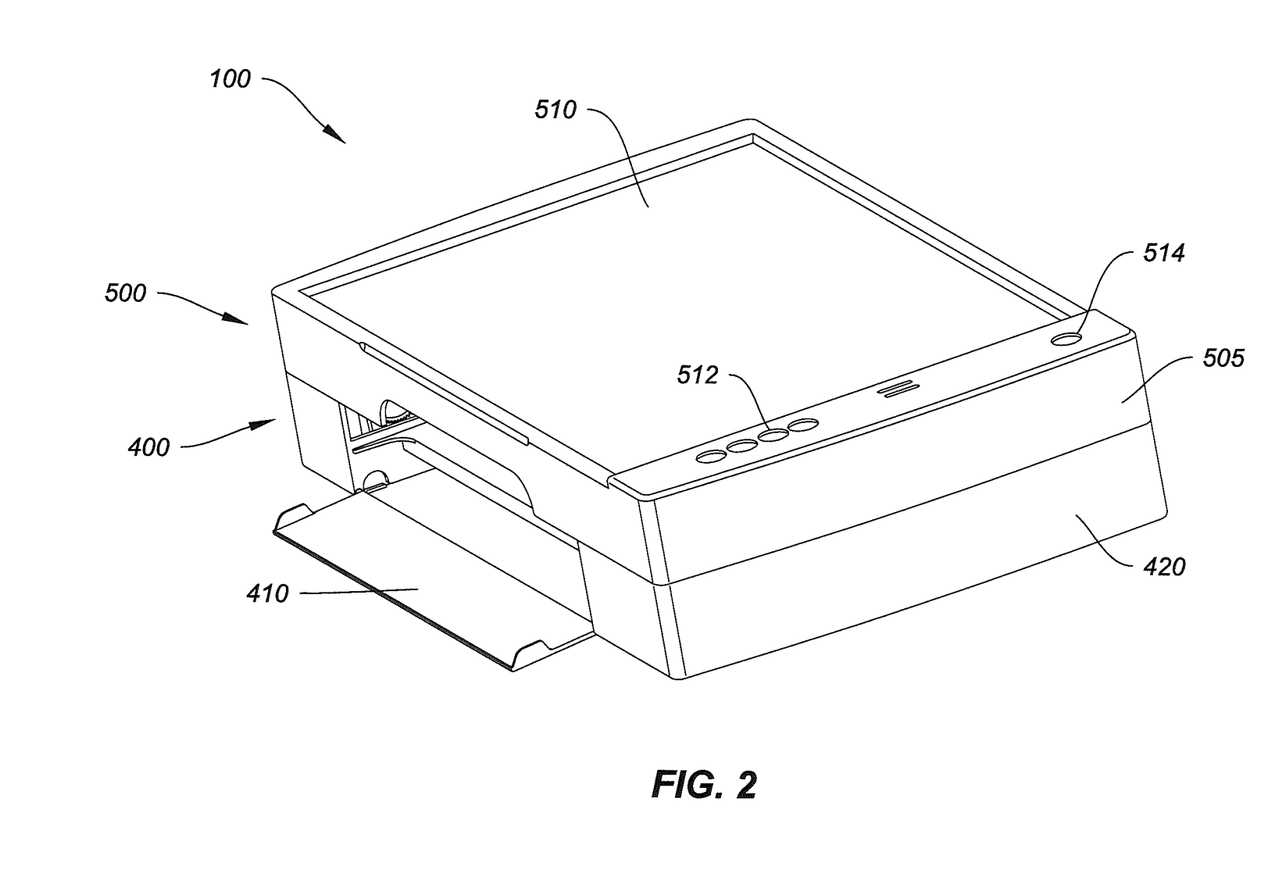
FIG. 2 is a perspective view that shows a multifunction printer according to an embodiment of the present invention.

FIG. 2 is a perspective view that shows a multifunction printer 100 according to an embodiment of the present invention. A scanning apparatus 500 is positioned atop a printing apparatus 400. Scanning apparatus 500 has a transparent platen 510, preferably glass, for supporting documents or other items to be scanned in order to convert an image into digitized data. Although the scanning apparatus preferably uses glass as the transparent member, any other suitable transparent member may also be used. An outer case 505 contains the various internal elements of the scanning apparatus 500. Mounted on case 505 are one or more operator controls 512, and optionally one or more indicators 514.

Embodiments of the present invention provide, within multifunction printer 100, a configuration for printing apparatus 400 that is assembled in a different manner from the "backbone" based construction described previously with reference to FIG. 1. In embodiments of the present invention, a number of structural parts have been eliminated, including those that previously defined the media travel path. Functions provided by the backbone in prior art printers, such as providing a support and attachment for a pinch roller assembly to provide a nip at the feed roller, are described in further detail below.

Figure 3:
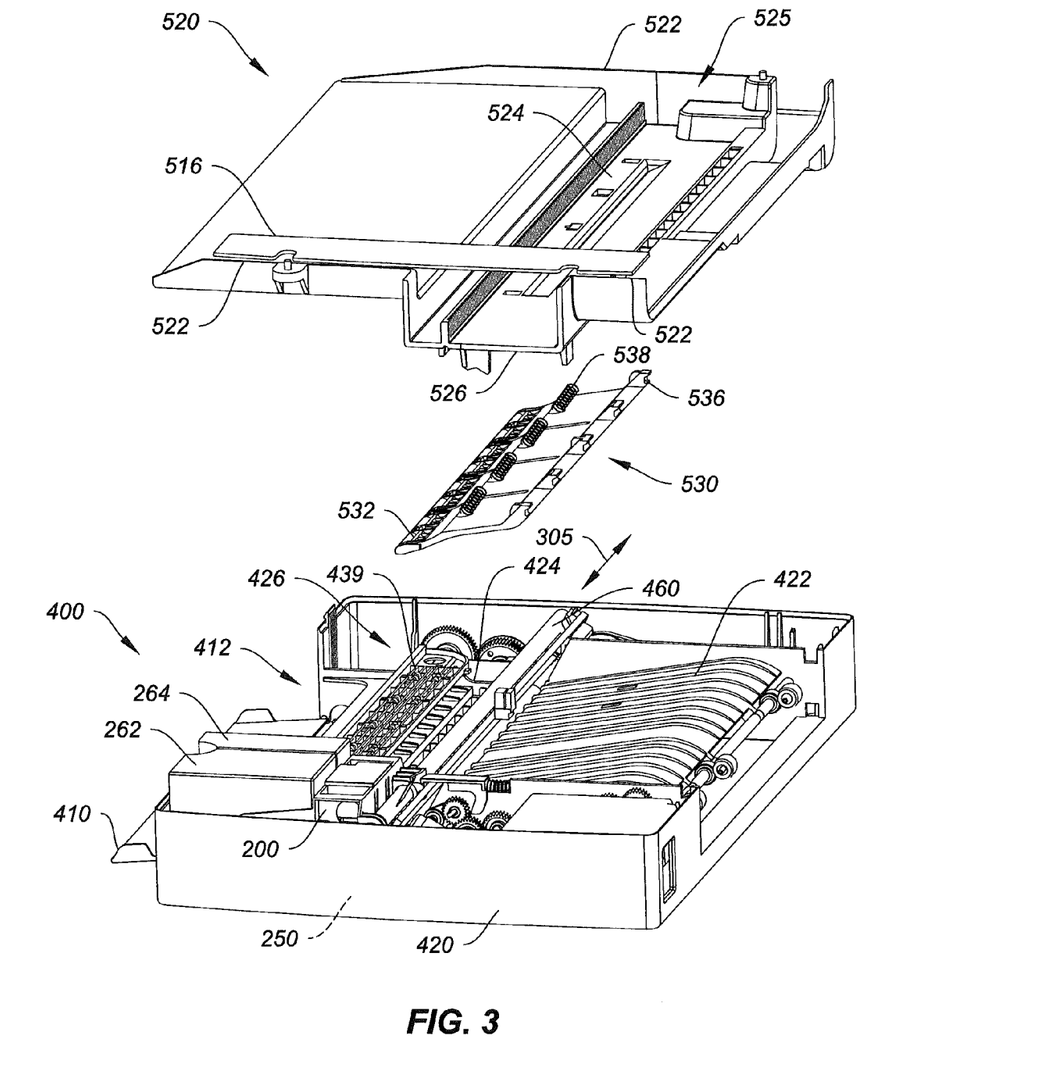
FIG. 3 is a partially exploded view that shows elements of the multifunction printer of FIG. 2.

Referring to the partially exploded view of FIG. 3, the case, the platen glass and most inner components (such as a scan bar and motor) of scanning apparatus 500 have been hidden, so that scanner base 520 can be seen more clearly. Scanner base 520 is shown removed from its assembled position, fitted against a printer chassis 420. Scanner base 520 can be formed of a single piece of plastic using injection molding, for example. At its top side it includes supports 522 for platen glass 510 (see FIG. 2). In other words, the top side of scanner base 522 faces platen glass 510. Also seen from the top perspective view of FIG. 3 is the scanner housing 525, which is formed as part of scanner base 520. An element of scanner housing 525 is rack 524 along which a scan bar (not shown) is used to scan documents that are placed on platen glass 510 (see FIG. 2). As described in more detail below, an aspect of the present invention is that a portion of the bottom surface 526 of scanner base 520 (on the side opposite the top side that faces the platen glass 510) forms a guide for recording media being fed through printing apparatus 400 for printing. The circuit board 516 is attached to the scanner base 520 but is not an integral part of the scanner base 520.

A pinch roller assembly 530 (also generically referred to herein as a biasing member), shown separately in the exploded view of FIG. 3, is affixed to the bottom of scanner base 520, and extends into the media travel path, downward in the orientation of FIG. 3. Affixing of pinch roller assembly 530 can be done by snap fitting fingers 536 to attachment members 537 (see FIG. 7) in scanner base 520 and attaching springs 538. Pinch rollers 532 are biased by springs 538 to press against the feed roller to form a nip 533 (see FIG. 6). A portion of the bottom surface of pinch roller assembly 530 defines another portion of the top of the media transport path to guide the recording medium, as described in more detail below.

Figure 4:
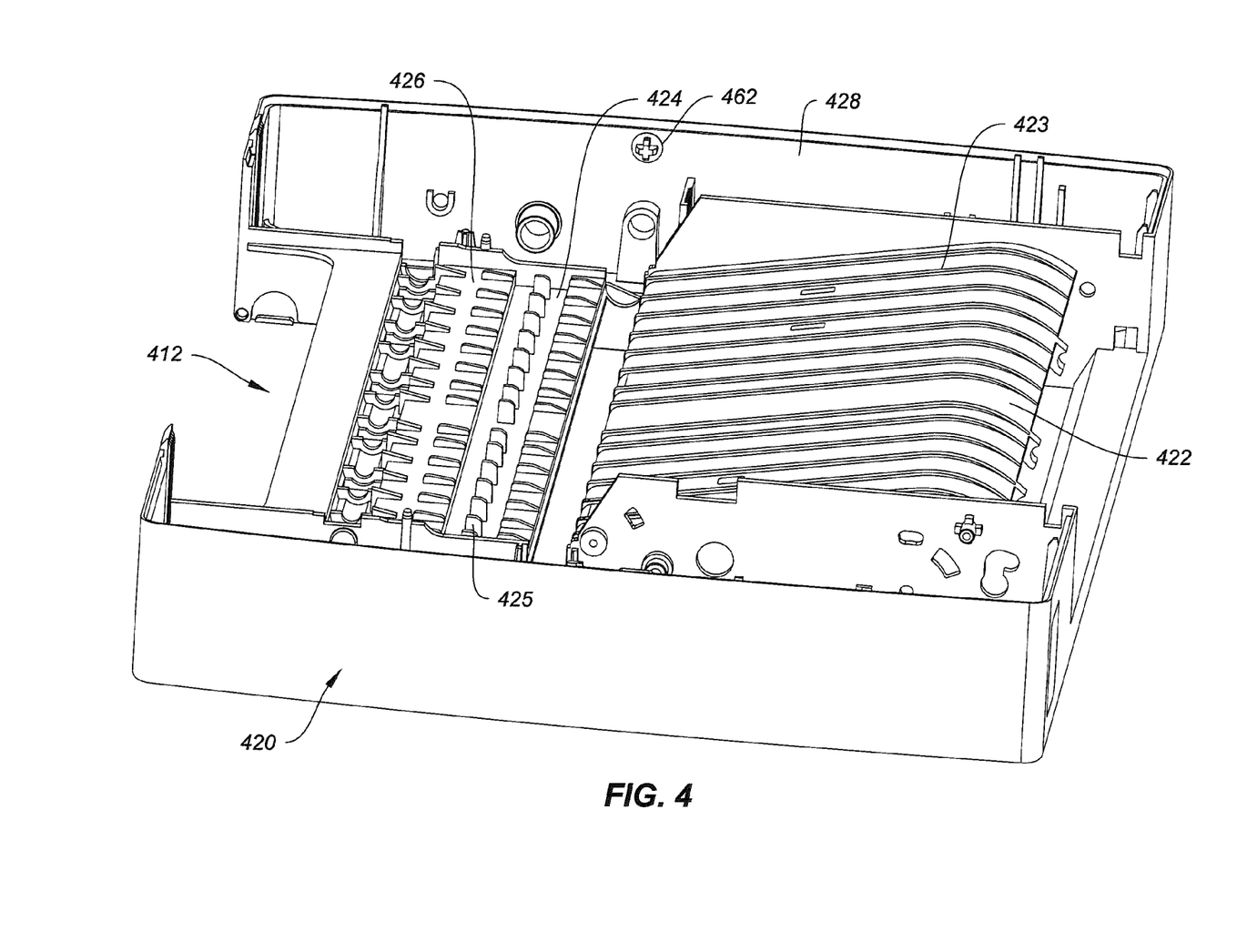
FIG. 4 is a perspective view that shows a printer chassis of FIG. 3.
Figure 5:
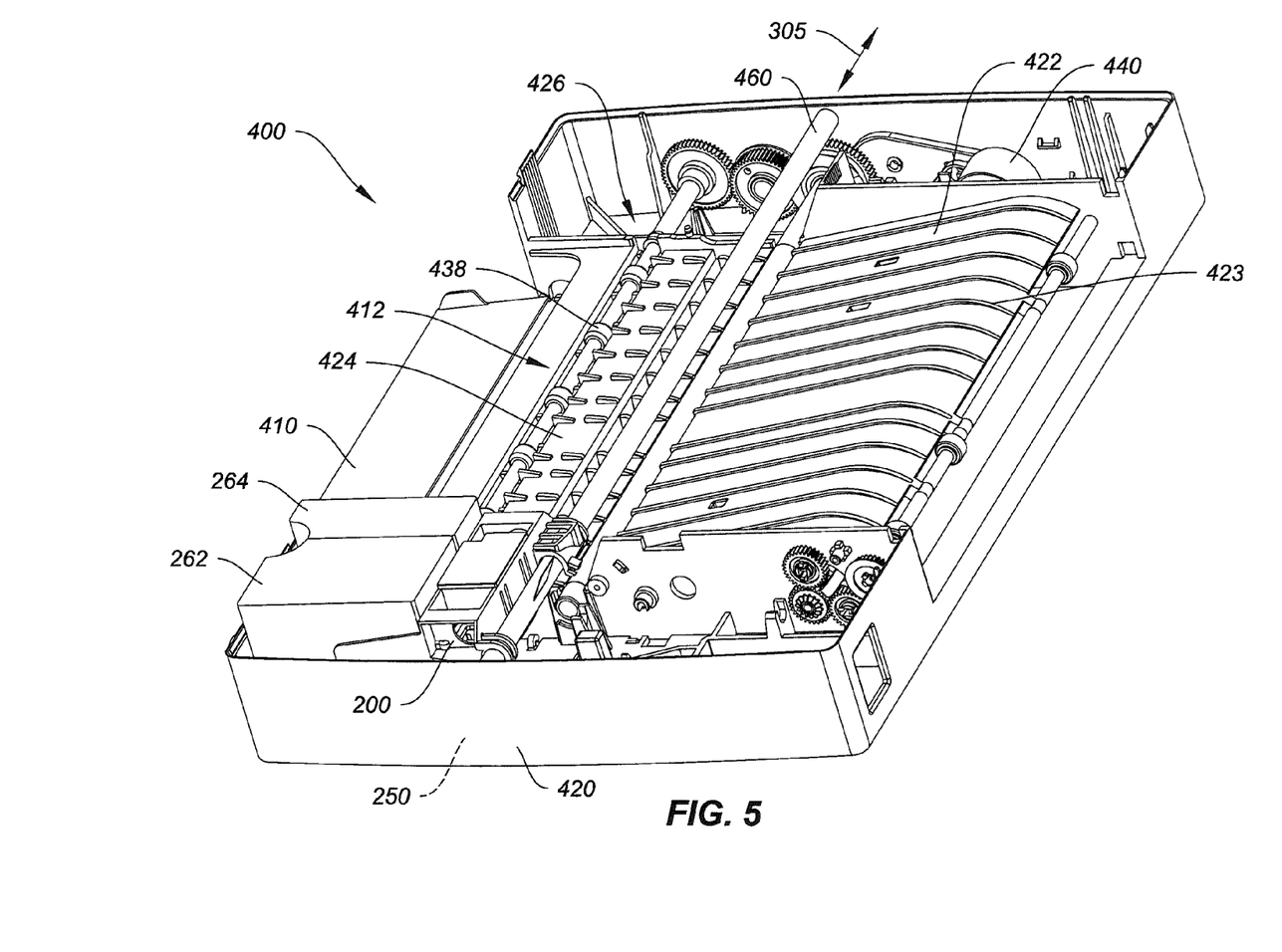
FIG. 5 is a perspective view of the printer chassis of FIG. 4 populated with components.

Some components of printing apparatus 400 are also shown in FIG. 3 and the close-up perspective view of FIG. 5, while the close-up perspective view of FIG. 4 shows the printer chassis 420 in isolation, empty of other components. Printer chassis 420 can be formed of a single piece of plastic using injection molding, for example. Printer chassis 420 includes a media input region 412 near door 410, a media support element 422, a printing region 424, and a discharge region 426. Various rollers are used to move recording medium along a media transport path as is described below relative to FIG. 6. A paper advance motor 440 provides power to rotate the rollers by various belts and gears that are shown in the example of FIG. 5, but not labeled. Media support element 422 can include a plurality of ribs 423 in order to reduce frictional drag on the moving recording medium. There can also be a plurality of ribs 425 in the printing region 424, as seen most clearly in FIG. 4. Ribs 425 support the paper in the printing region and are positioned to avoid overspray of ink during borderless printing on recording media of standard sizes. A carriage guide 460 is mounted to printer chassis 420 and held in place by retainer 462 on side wall 428 of printer chassis 420 (shown in FIG. 4). A carriage 200 is slidably mounted on carriage guide 460 and is configured to move a printhead 250 (hidden behind the wall of printer chassis 420) and its ink supplies 262 and 264 in a carriage scan direction 305 along printing region 424 in order to print an image one swath at a time.

Figure 6:
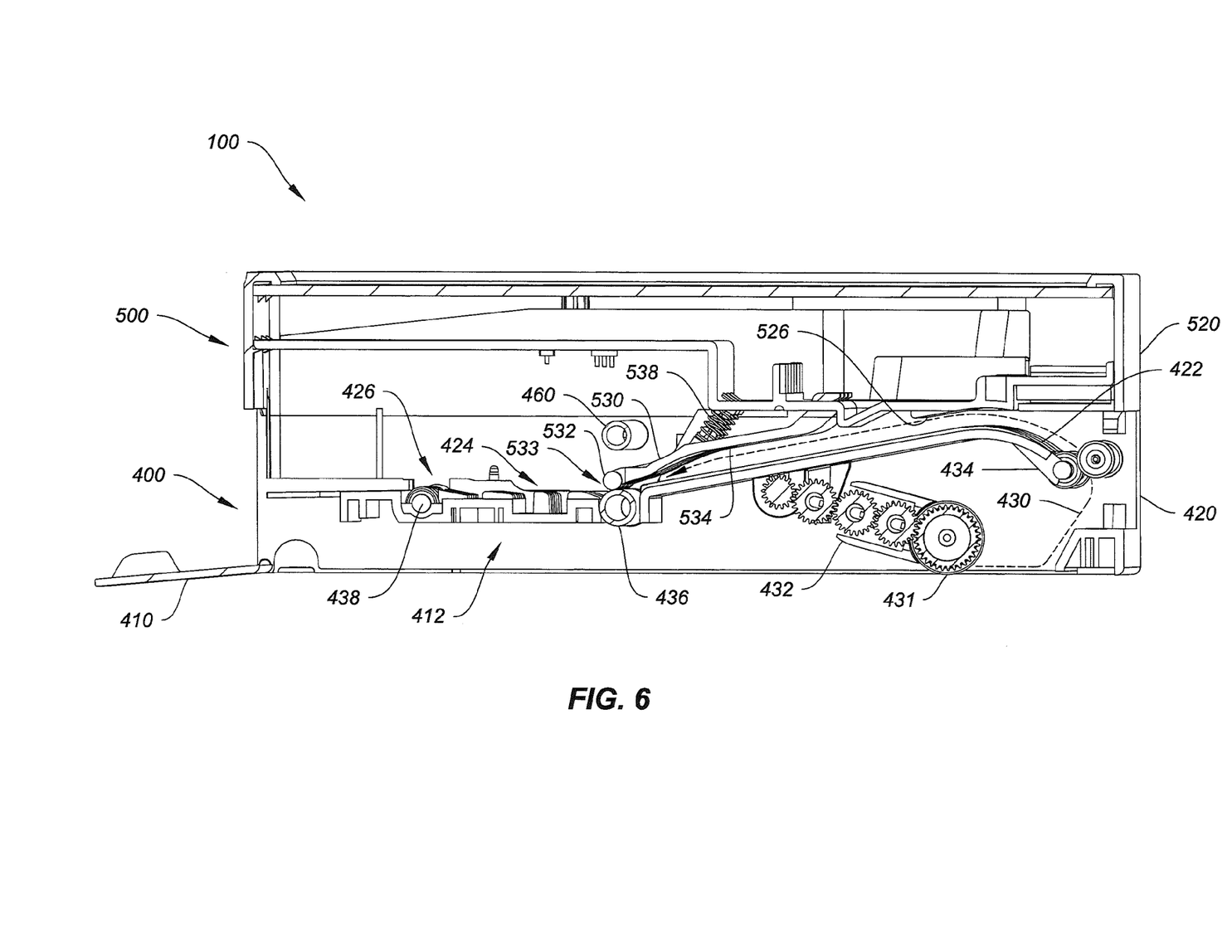
FIG. 6 is a cross-section view of the multifunction printer of FIG. 2 that shows the media transport path for the printing apparatus.

FIG. 6 shows a cross-sectional view of the multifunctional printer of FIG. 2. During printing, recording medium (not shown) is moved along a media transport path 430 (indicated as a dashed line) from media input region 412, across the media support element 422, then to the printing region 424, and finally to the discharge region 426. In particular, a pick roller 431 on pick arm 432 moves the recording medium from media input region 412 toward turn rollers 434 and to the media support element 422 that is located above media input region 412 when the multifunction printer 100 is oriented in its operating position. (A cleanout element that provides a curved guide surface to guide the recording medium upward from the pick roller 431 to the turn rollers 434 is not shown.)

After the recording medium passes the turn rollers 434, the tendency of the recording medium to remain substantially straight causes the recording medium to contact the bottom of scanner base 520. In other words, the bottom surface 526 of scanner base 520, located above media support element 422, provides an upper guide for the recording medium as it passes through this region. As the recording medium continues to advance along media transport path 430, it passes below pinch roller assembly 530. In other words, the bottom surface 534 of pinch roller assembly 530, as well as the top of media support element 422, act as guides for the recording medium as it passes through this region. The recording medium is thus guided into the nip 533 formed by pinch rollers 532 that are biased by springs 538 against rotating feed roller 436, to move the recording medium across printing region 424 and over to discharge region 426. A discharge roller 438 (seen in FIGS. 5 and 6) drives the recording medium toward door 410. A star wheel assembly 439 (seen in FIG. 3) positioned over the discharge roller pushes the paper into the discharge roller without smearing the ink on the freshly printed recording medium.

Figure 7:
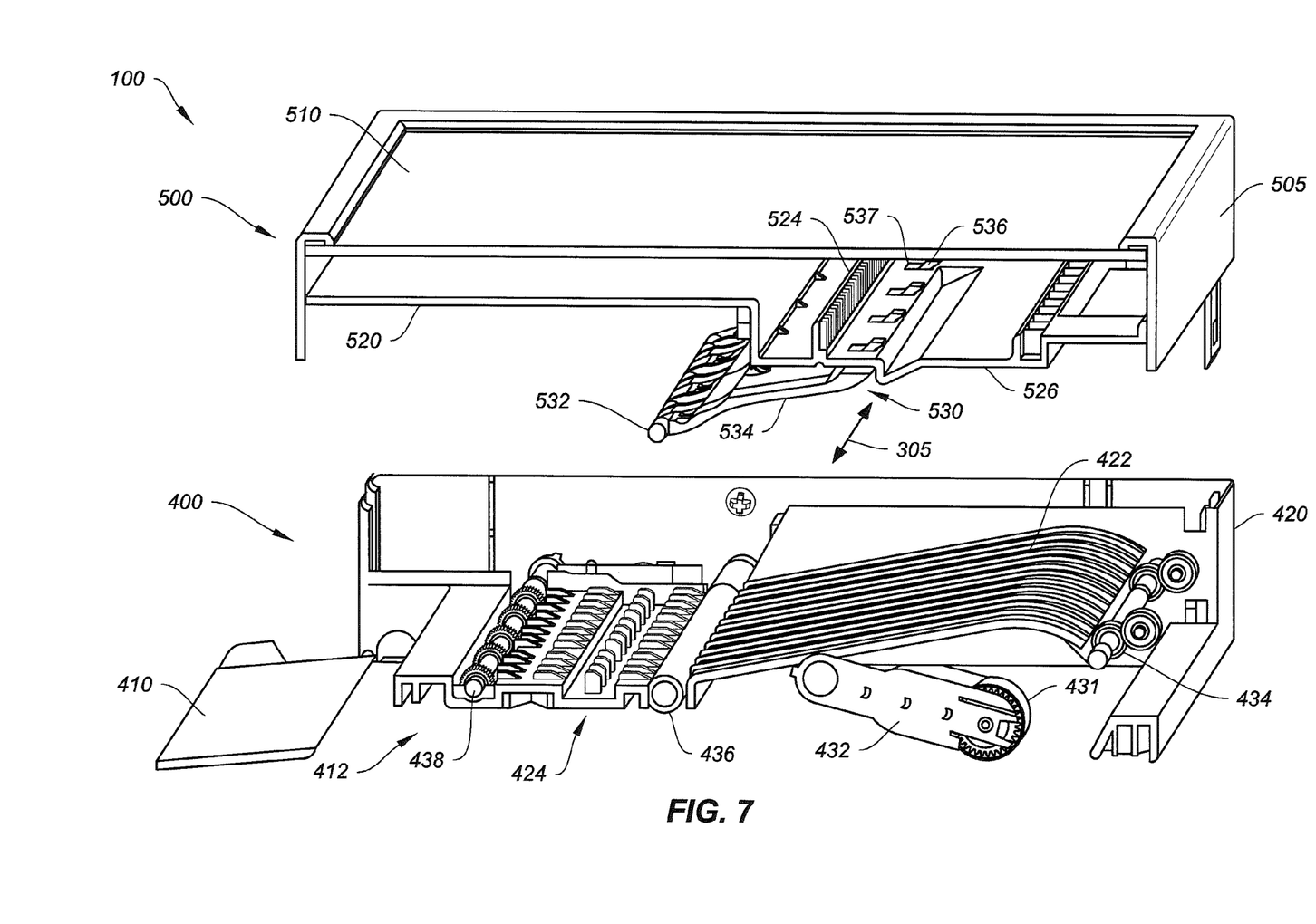
FIG. 7 is a partially exploded cross-sectional view of the multifunction printer of FIG. 2.

FIG. 7 is a partially exploded cross-sectional view of the multifunction printer 100. Many of the components described with reference to previous figures are shown more clearly in FIG. 7. In addition, FIG. 7 shows pinch roller assembly 530 affixed to scanner base 520 by fingers 536 extending through attachment openings 537. In order for the pinch rollers 532 to provide a suitable biasing force on feed roller 436, it is desirable for pinch roller assembly 530 to be able to pivot about an axis parallel to the feed roller 436 (i.e. parallel to carriage scan direction 305) by at least ten degrees, and preferably by fifteen degrees. Attachment openings 537 provide room for fingers 536 to move such that pivoting of the pinch roller assembly 530 is enabled.

Figure 8:
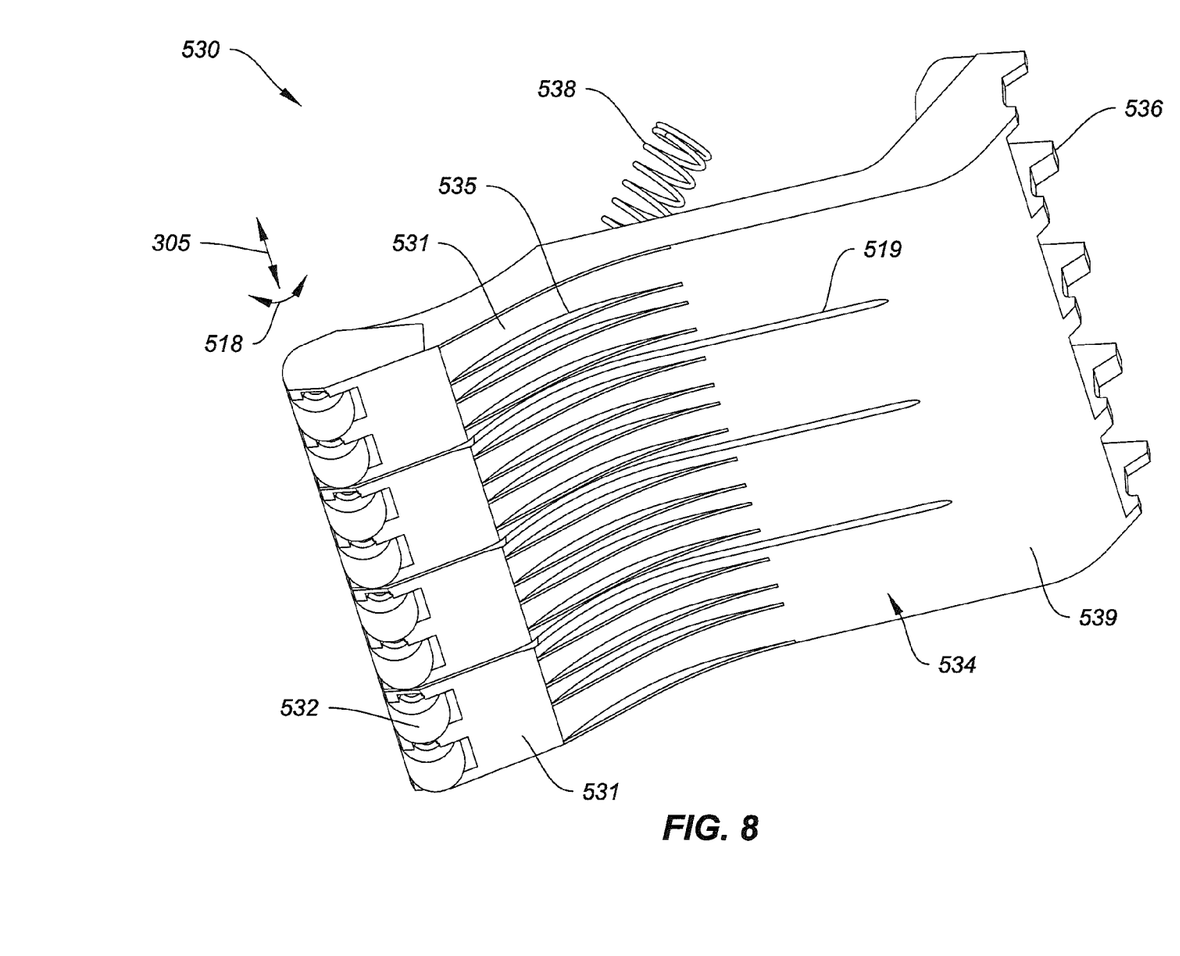
FIG. 8 is a perspective view of a pinch roller assembly according to a embodiment of the invention.

FIG. 8 is a close-up perspective view of the bottom of pinch roller assembly 530. On the bottom surface 534 that faces printer chassis 420 (when assembled) and functions as an upper guide for recording medium, as described above relative to FIG. 6, are a plurality of ribs 535. Ribs 535 help to reduce frictional drag between the recording medium and the bottom surface 534 of pinch roller assembly 530 as the recording medium is being advanced past the pinch roller assembly 530. In the embodiment shown in FIG. 8, pinch roller assembly 530 is subdivided into four sections 531, each section having two pinch rollers 532. The sections are separated by slots 519 from each other near the pinch rollers 532 and also near the ribs 539. Near fingers 536, pinch roller assembly 530 has a joining portion 539 from which all four sections 531 extend. In addition to entire pinch roller assembly 530 being able to pivot about fingers 536, the pinch rollers 532 of each section 531 can pivot independently of pinch rollers 532 of the other sections along pivot direction 518 about an axis that is parallel to carriage scan axis 305. Each section 531 is also biased independently by springs 538. In this way, recording media of different widths can be uniformly pressed into the nip 533 at feed roller 536 (see FIG. 6) by pinch rollers 532 of the sections 531 that contact the recording medium rather than lifting an end of pinch roller assembly 530 and causing the line of pinch rollers to be out of parallel with feed roller 436. Different media thicknesses can also be accommodated by the pivoting motion.

Figure 9:
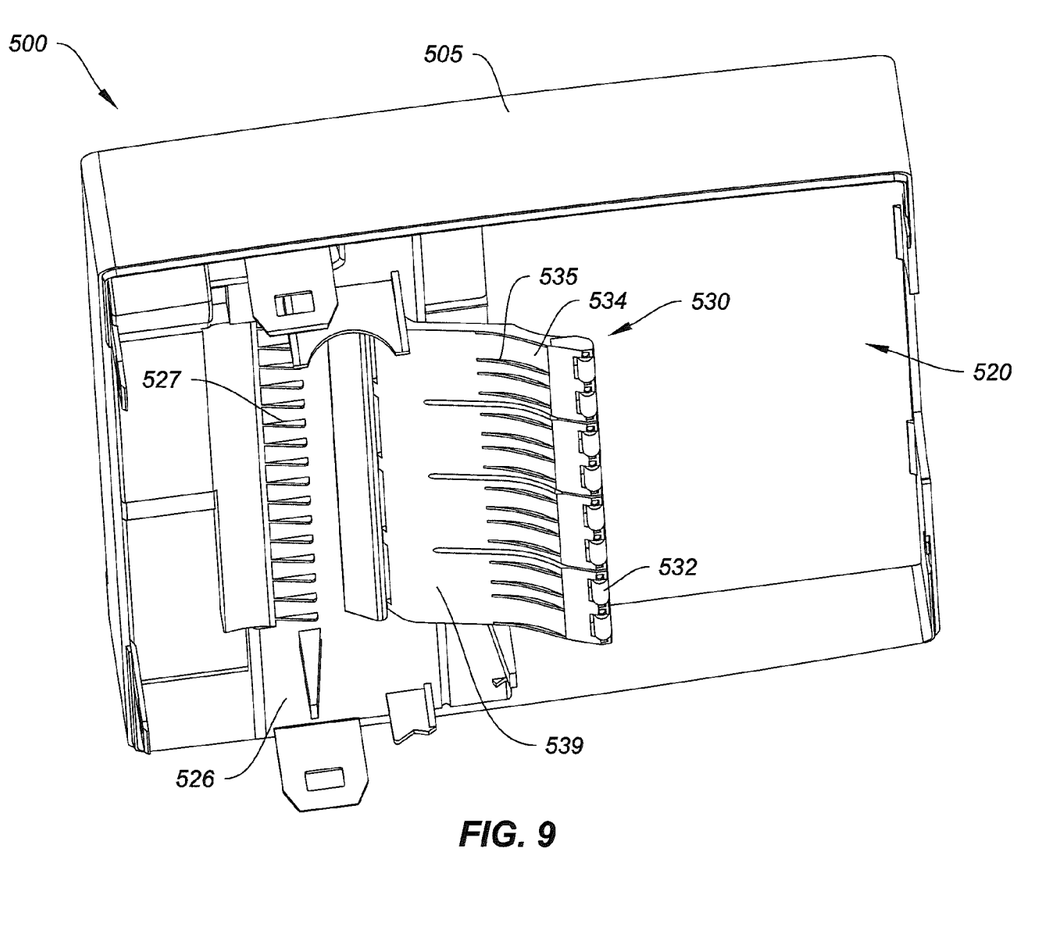
FIG. 9 is a perspective view of the bottom of the scanner base of the multifunction printer of FIG. 2.

FIG. 9 is a bottom perspective view of scanning apparatus 500 with pinch roller assembly 530 affixed to scanner base 520. This view is rotated with respect to previous views such that the pinch roller assembly 530 (from joining portion 539 to pinch rollers 532) points toward the right rather than to the left. In addition to showing another view of components previously described, FIG. 9 shows ribs 527 formed on the bottom of scanner base 520 (i.e. on guide surface 526) in order to reduce frictional drag on recording medium being advanced along media transport path 430 (see FIG. 6).

The invention has been described in detail with particular reference to certain preferred embodiments thereof, but it will be understood that variations and modifications can be effected within the spirit and scope of the invention.

PARTS LIST

100 Multifunction printer
200 Carriage
250 Printhead
262 Ink supply
264 Ink supply
300 Printer
302 Load entry direction
303 Printing region
304 Direction
305 Carriage scan direction
306 Right side
307 Left side
308 Front
309 Rear
310 Hole
311 Feed roller gear
312 Feed roller
313 Forward direction
330 Maintenance station
380 Motor
382 Guide rail
385 Backbone
384 Belt
390 Electronics board
392 Cable connectors
400 Printing apparatus
410 Door
412 Media input region
420 Printer chassis
422 Media support element
423 Ribs (on media support element)
424 Printing region
425 Ribs (in printing region)
426 Discharge region
428 Side wall
430 Media transport path
431 Pick roller
432 Pick arm
434 Turn roller
436 Feed roller
438 Discharge roller
439 Star wheel assembly
440 Paper advance motor
460 Carriage guide
462 Retainer (for carriage guide)
500 Scanning apparatus
505 Case
510 Transparent platen
512 Control
514 Indicator
516 Printed circuit board
518 Pivot direction
519 Slot
520 Scanner base
522 Supports (for platen glass)
524 Rack 525 Scanner housing
526 Guide surface (of scanner base)
527 Ribs (on guide surface of scanner base)
530 Pinch roller assembly (biasing member)
531 Section (of pinch roller assembly)
532 Pinch rollers
533 Nip
534 Bottom surface (of pinch roller assembly)
535 Ribs (on pinch roller assembly)
536 Finger(s)
537 Attachment openings
538 Spring(s)
539 Joining portion (of pinch roller assembly)

The invention claimed is:

1. A multifunction printer comprising:
   a) a printing apparatus including:
      i) a printer chassis having a media input region, a printing region, and a media support element;
      ii) a carriage configured to move a printhead in a carriage scan direction along the printing region; and
      iii) a plurality of rollers configured to transport a recording medium from the media input region, across the media support element and to the printing region; and
   b) a scanning apparatus having a transparent platen for supporting a document to be scanned in order to convert an image into digitized data, the scanning apparatus including a base that is affixed to the printer chassis, wherein the base of the scanning apparatus comprises a guide for guiding the recording medium through the media transport path toward the printing region;
   wherein the plurality of rollers includes a feed roller; the multifunction printer further comprising a biasing member configured to form a nip against the feed roller, wherein the biasing member is affixed to the base of the scanning apparatus.

2. The multifunction printer of claim 1, wherein the biasing member includes a plurality of pinch rollers configured to press against the feed roller to form the nip.

3. The multifunction printer of claim 2 further comprising a plurality of springs that are configured to provide a biasing force on the biasing member to press the pinch rollers against the feed roller.

4. The multifunction printer of claim 2, the biasing member including a first section and a second section, each section including at least one pinch roller, wherein the pinch roller(s) of the first section can be moved away from the feed roller independently of the pinch roller(s) of the second section.

5. The multifunction printer of claim 4, the biasing member further including a joining portion wherein the first section is separated from the second section by a slot that extends from the pinch rollers to the joining portion.

6. The multifunction printer of claim 1, wherein the biasing member is pivotably affixed to the base of the scanning apparatus, so that the biasing member can be pivoted by at least ten degrees about an axis that is parallel to the carriage scan direction.

7. The multifunction printer of claim 1, wherein the biasing member is configured to be snap fitted to the base of the scanning apparatus.

8. The multifunction printer of claim 1, the biasing member including a side facing the printer chassis, wherein the side facing the printer chassis is configured to guide the recording medium as the recording medium moves across a portion of the media support element.

9. The multifunction printer of claim 8, wherein the side of the biasing member facing the printer chassis includes a plurality of ribs.

10. The multifunction printer of claim 1, wherein the scanner base is formed of a single piece of plastic.

11. The multifunction printer of claim 1, wherein the printer chassis is formed of a single piece of plastic.

12. A multifunction printer comprising:
    a) a printing apparatus including:
       i) a printer chassis having a media input region, a printing region, and a media support element';
       ii) a carriage configured to move a printhead in a carriage scan direction along the printing region; and
       iii) a plurality of rollers configured to transport a recording medium from the media input region, across the media support element and to the printing region; and
       wherein the media support element of the printer chassis includes a plurality of ribs;
    b) a scanning apparatus having a transparent platen for supporting a document to be scanned in order to convert an image into digitized data, the scanning apparatus including a base that is affixed to the printer chassis, wherein the base of the scanning apparatus comprises a guide for guiding the recording medium through the media transport path toward the printing region;
    wherein the guide of the base of the scanning apparatus includes a plurality of ribs.

13. The multifunction printer of claim 12, and wherein the guide for the recording medium is disposed on a surface of the base.

14. A multifunction printer comprising:
    a) a printing apparatus including:
       i) a printer chassis having a media input region, a printing region, and a media support element;
       ii) a carriage configured to move a printhead in a carriage scan direction along the printing region; and
       iii) a plurality of rollers configured to transport a recording medium from the media input region, across the media support element and to the printing region; and
    b) a scanning apparatus having a transparent platen for supporting a document to be scanned in order to convert an image into digitized data, the scanning apparatus including a base that is affixed to the printer chassis, wherein the base of the scanning apparatus comprises a guide for guiding the recording medium through the media transport path toward the printing region;
    wherein the media input region being disposed proximate a bottom of the printer chassis, wherein the media support element is disposed above the media input region and the guide of the scanner base is disposed above the media support element when the multifunction printer is oriented in its operating position.

15. The multifunction printer of claim 14, the plurality of rollers including a turn roller that is configured to move the recording medium along a pathway bounded below by the media support element and bounded above by the guide of the scanner base.

* * * * *